COMPUTER FOR MULTIPLICATION OR DIVISION OF VARIABLE QUANTITIES

Filed Feb. 11, 1959 8 Sheets-Sheet 1

INVENTOR.
EDWIN Z. GABRIEL
Edwin Z. Gabriel

COMPUTER FOR MULTIPLICATION OR DIVISION OF VARIABLE QUANTITIES

INVENTOR.
EDWIN Z. GABRIEL.
Edwin Z. Gabriel

Feb. 28, 1961 E. Z. GABRIEL 2,973,147

COMPUTER FOR MULTIPLICATION OR DIVISION OF VARIABLE QUANTITIES

Filed Feb. 11, 1959 8 Sheets-Sheet 3

INVENTOR.
EDWIN Z. GABRIEL
Edwin Z. Gabriel

COMPUTER FOR MULTIPLICATION OR DIVISION OF VARIABLE QUANTITIES

Filed Feb. 11, 1959

INVENTOR.
EDWIN Z. GABRIEL
Edwin Z. Gabriel

COMPUTER FOR MULTIPLICATION OR DIVISION OF VARIABLE QUANTITIES

INVENTOR
Edwin Z. Gabriel

Feb. 28, 1961 E. Z. GABRIEL 2,973,147

COMPUTER FOR MULTIPLICATION OR DIVISION OF VARIABLE QUANTITIES

Filed Feb. 11, 1959 8 Sheets-Sheet 6

INVENTOR

Edwin Z. Gabriel

Feb. 28, 1961 E. Z. GABRIEL 2,973,147

COMPUTER FOR MULTIPLICATION OR DIVISION OF VARIABLE QUANTITIES

Filed Feb. 11, 1959 8 Sheets-Sheet 7

INVENTOR

Edwin Z. Gabriel

INVENTOR.
EDWIN Z. GABRIEL
Edwin Z. Gabriel

United States Patent Office 2,973,147
Patented Feb. 28, 1961

2,973,147

COMPUTER FOR MULTIPLICATION OR DIVISION OF VARIABLE QUANTITIES

Edwin Z. Gabriel, St. Davids, Pa.
(91 Mount Tabor Way, Ocean Grove, N.J.)

Filed Feb. 11, 1959, Ser. No. 792,628
10 Claims. (Cl. 235—195)

The present invention relates to either an automatic or manual type computer, and it relates more particularly to an electro-mechanical computer adapted to the multiplication or division of numbers or variable quantities as well as to performance of coordinate conversion, and is a continuation-in-part of my prior application, Serial No. 610,263, which has been abandoned.

It is often necessary or desirable to multiply in an electrical manner, whereby data may be applied to a computer circuit and a solution may be obtained in the form of a voltage. Also in analogue computers, it is often required to produce a voltage that is equal to, or proportional to, the product of two given voltages of shaft displacements. A number of both electronic circuits and mechanical link mechanisms have been devised, but these are generally fairly complex or else their accuracy is not good enough for many applications.

One function of this device is an electro-mechanical multiplier which is capable of moderate accuracy and fast response to input information. Another function of this device is to perform division.

Various military and non-military applications of such a computer are listed below:

(1) For multiplication and division of analog quantities for the solution of thermodynamic relationships for regulating the power control system of a turbo-jet engine.

(2) For application to performing the necessary computations involved in an automatic pilot system of an aircraft or pilotless guided missile.

(3) For any computation wherein moderate accuracy is satisfactory.

It is an object of this invention to multiply variable X by variable $Y_2$ to obtain the product $Y_1$.

It is still another object of this invention to divide $Y_1$ by X to obtain the quotient $Y_2$.

Referring to the accompanying drawings, in which like numerals of reference indicate similar parts thruout the several views:

Figure 1 illustrates the geometry of the problem and shows the two main portions of one version of the computer.

Figure 2 gives the simple circuits and block diagrams of the components of the computer.

Figures 3 to 8, inclusive, are mechanical drawings of the computer.

Figure 9 gives the electrical circuits of the components including servo systems to introduce input information automatically to the computer and switches to give the proper sign to the output.

Figure 12:
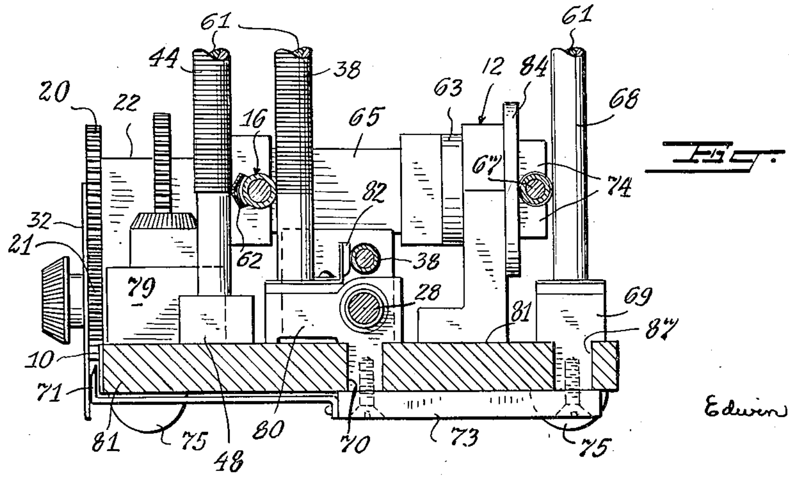
Figures 11, 12, 13, 14, 16, 17:
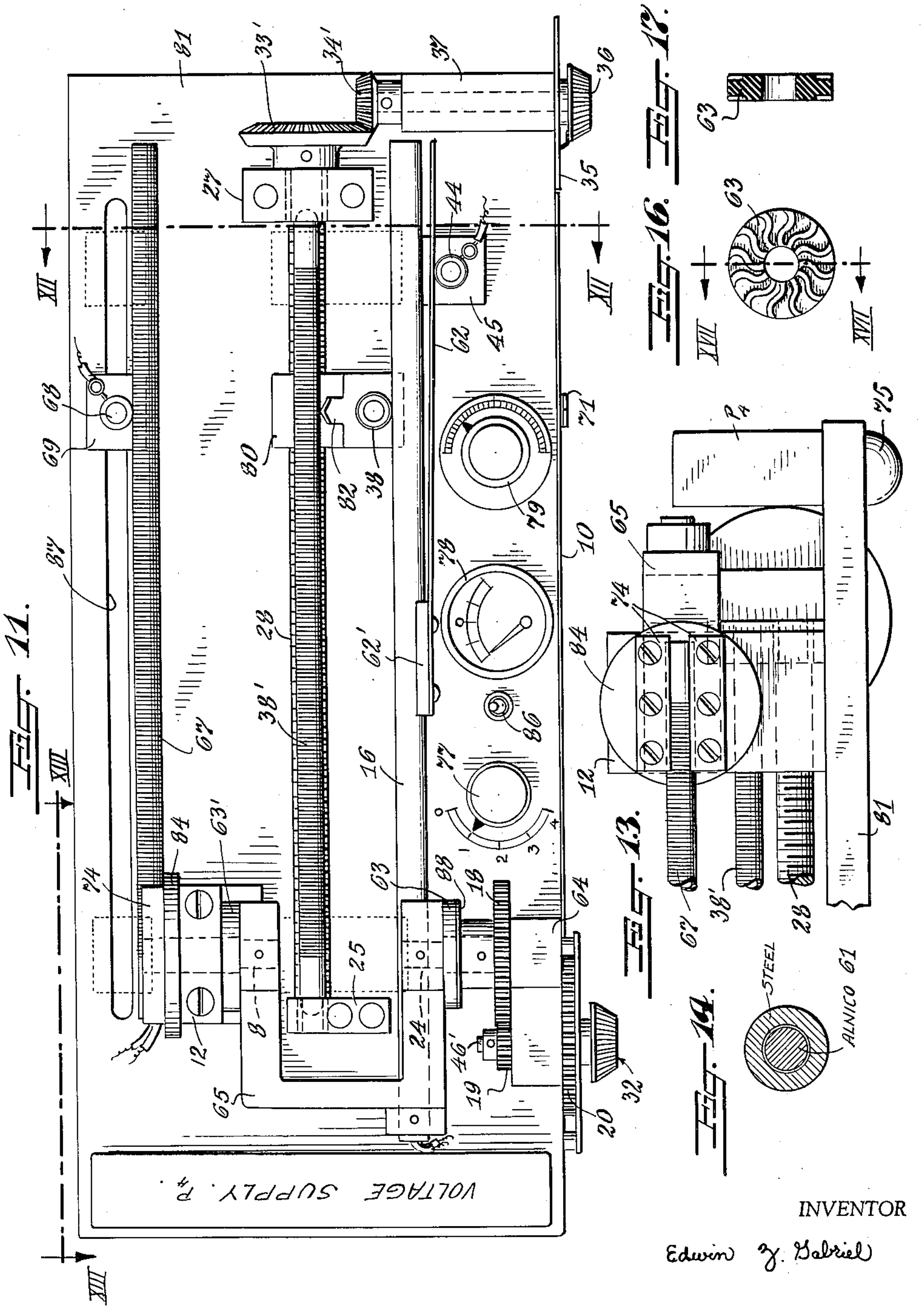
Figure 11 is a plan view.

Figure 12 is a cross section on line XII—XII of Fig. 11 to show how vertical arms 38 and 68 are held together under base 81.

Figure 13 is a fragmentary elevation to show how resistance rod 67 is clamped in position.

Figure 14 is a cross sectional view of the conducting rod showing the magnetic rod in position within the tubular steel rod.

Figure 15:
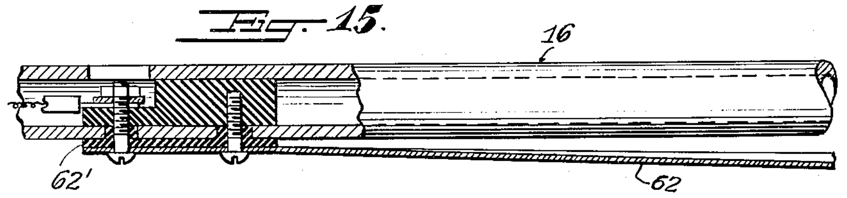

Figure 15 is a plan, partially in section, of the combined good conductor rod and complementary conductor attached thereto.

Figure 16 is a front view of a resilient washer.

Figure 17 is a diametric sectional view of the resilient washer on line XVII—XVII of Fig. 17.

Figure 18:
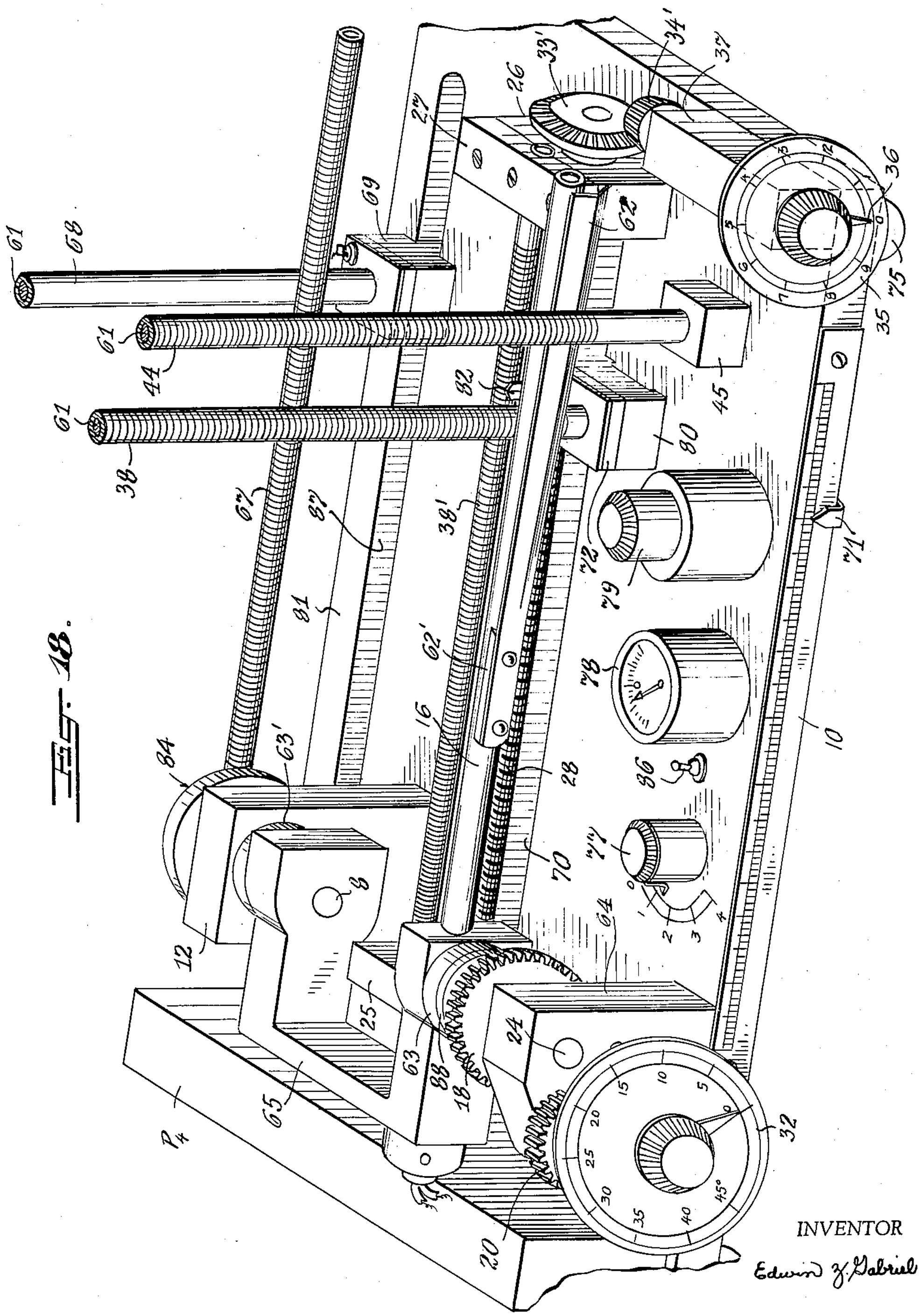

Figure 18 is an isometric view of the entire computer.

Figures 19, 20:
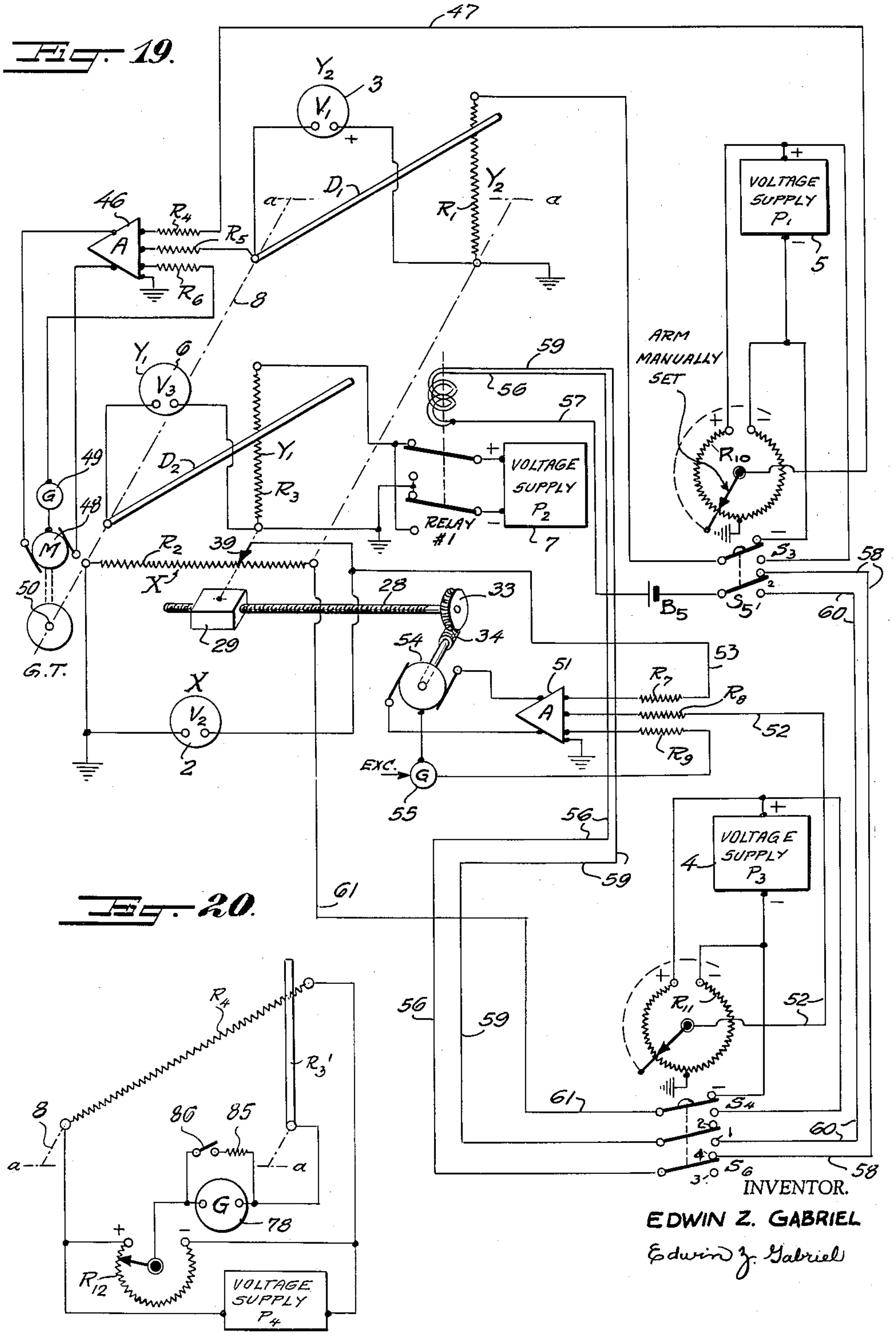

Figures 19 and 20 give the electrical circuits of the components including servo systems to introduce input information automatically.

Figures 1, 2, 4, 5:
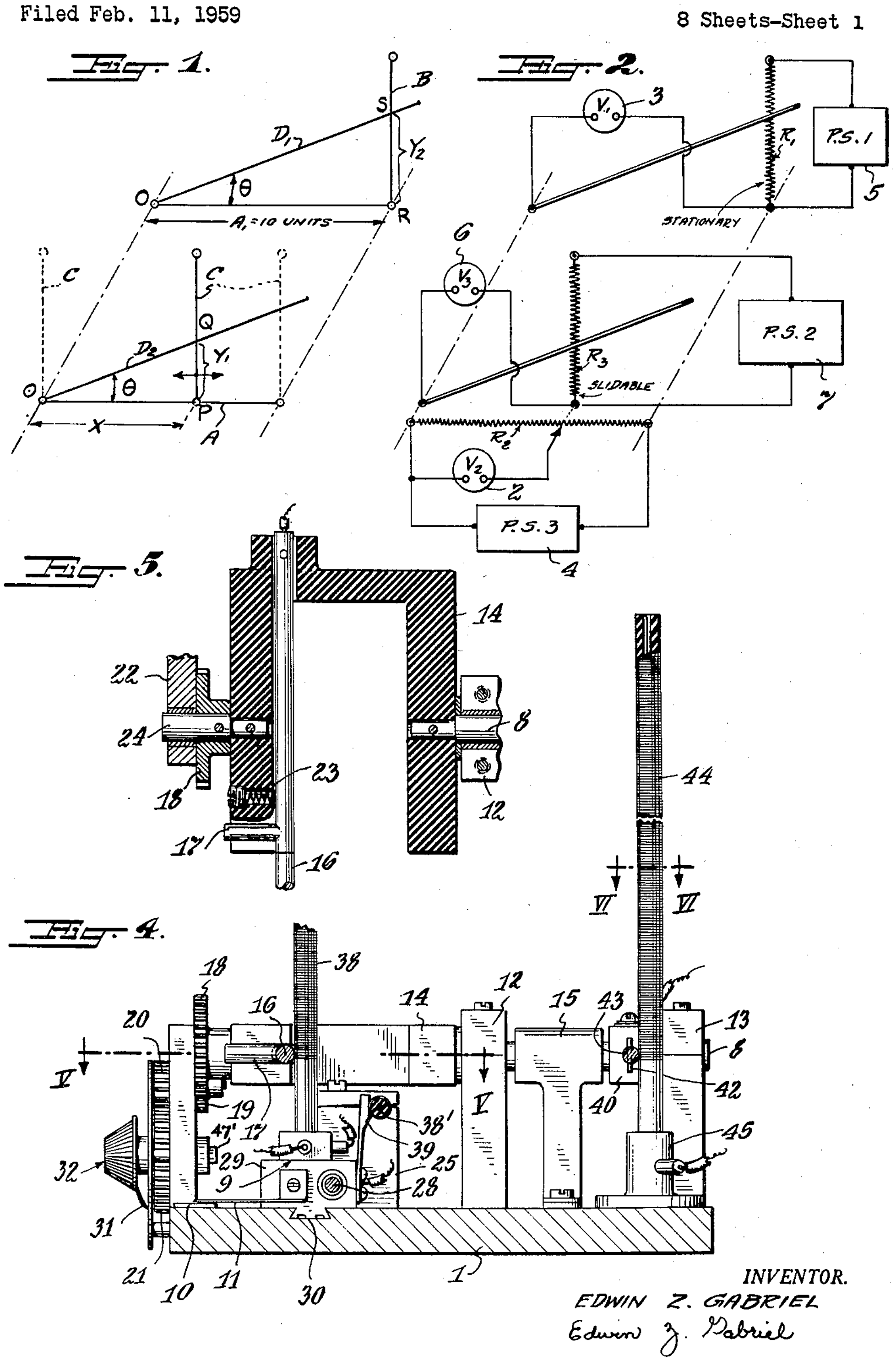

In the specific embodiment of the invention illustrated in said drawings, and referring initially to the construction of Figure 1 it will be seen that at the rear half of Figure 1, distance $Y_2$ represents one variable. Distance $A_1$ is fixed. Referring to the front half, distance X represents the other variable and distance $Y_1$ then represents the product of X and $Y_2$. It is apparent from observation of the figure that two similar right triangles exist. They are ORS and OPQ. Hence, by geometry of similar triangles, the following mathematical relationship is true:

$$\frac{Y_1}{X}=\frac{Y_2}{A} \quad (1)$$

$$Y_1=\frac{XY_2}{A} \quad (2)$$

Let A=10 units, then:

$$Y_1=\frac{XY_2}{10} \quad (3)$$

Thus it is shown that $Y_1$ equals the product of X and $Y_2$ divided by 10.

Similarly, it can be shown that either $Y_2$ or X can be the quotient of a divisor and dividend.

Referring to Equation 1 and solving for $Y_2$, $$Y_2=\frac{AY_1}{X} \quad (4)$$

where $A=10$ units again.

Thus, $Y_2$ is the quotient of $Y_1$ divided by X and multiplied by a factor of ten (10). The factor of 10 may be included in the calibration of voltmeter $V_1$.

Assuming voltages applied across elements $R_1$, $R_2$ and $R_3$ are all equal and the lengths and resistance values of the elements are the same too, the voltmeter $V_3$ would have the same units as voltmeters $V_1$ and $V_2$ multiplied by a factor of 10.

Figure 8:
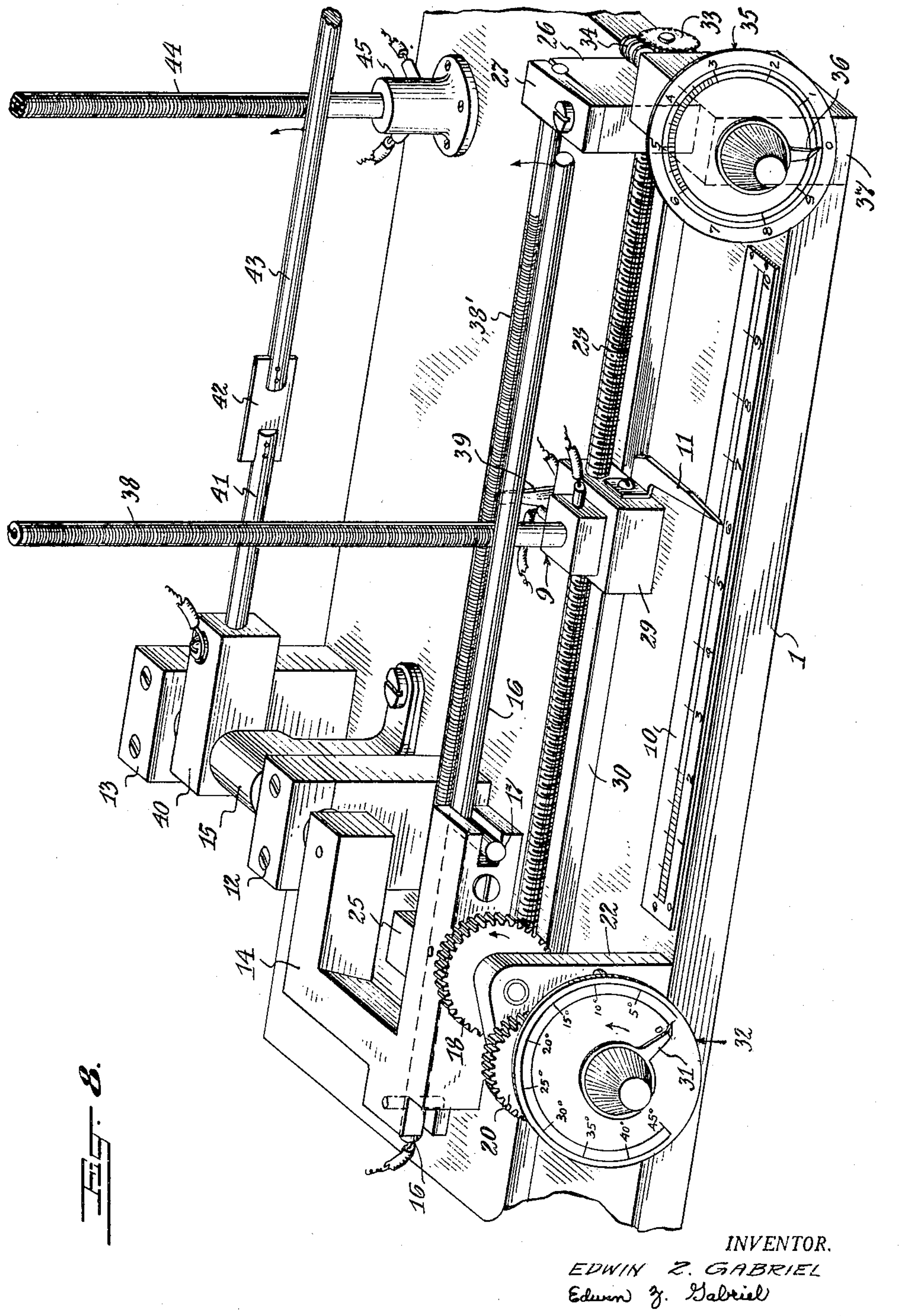

To explain how the product of two quantities is obtained by means of the computer, refer to Figs. 2 and 8. The procedure is as follows:

(1) Knob of graduated dial 32 is rotated counterclockwise manually until given distance $Y_2$ is indicated both on voltmeter $V_1$ and also on dial 32.

(2) Next vertical member 38 is moved to the right translationally along slot 30 by rotating knob of graduated dial 35 manually until distance X is registered both on voltmeter $V_2$ and on dial 35.

(3) Now the product of X and $Y_2$ is given directly on voltmeter $V_3$. The reading represents the distance $Y_1$ multiplied by 10, as given by mathematical relationship 3.

If the multiplier and multiplicand are continually varying quantities, then it is suggested that servo systems be used to automatically position rod $D_1$ and vertical member 38. Output voltage representing $Y_1$ may be introduced to an electronic recording device to record the product on coordinate graph paper, if desired. Also the output voltage may be applied to any other desired output device capable of accepting a voltage input.

To explain how the quotient of two quantities is obtained, again refer to Figs. 2 and 8. The procedure is as follows:

(1) Vertical member 38 is moved translationally along slot 30 by means of rotating knob and pointer 36 manually until given distance X corresponding to the multiplier is indicated either on voltmeter $V_2$ or on graduated dial 35.

(2) Next knob of graduated dial 32 is rotated manually until given distance $Y_1$ is indicated on voltmeter $V_3$.

(3) Now the quotient $Y_1$ divided by X is indicated either on voltmeter $V_1$ or on dial 32, as given by the mathematical relationship 4.

If the divisor and dividend are continuously varying quantities, it is suggested that servo systems be used to automatically position rod $D_2$ and vertical member 38. The output voltage representing $Y_2$ may be introduced to any desired output device which will accept a voltage input.

Figure 7:
Figure 6:
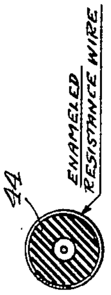
Figure 3:
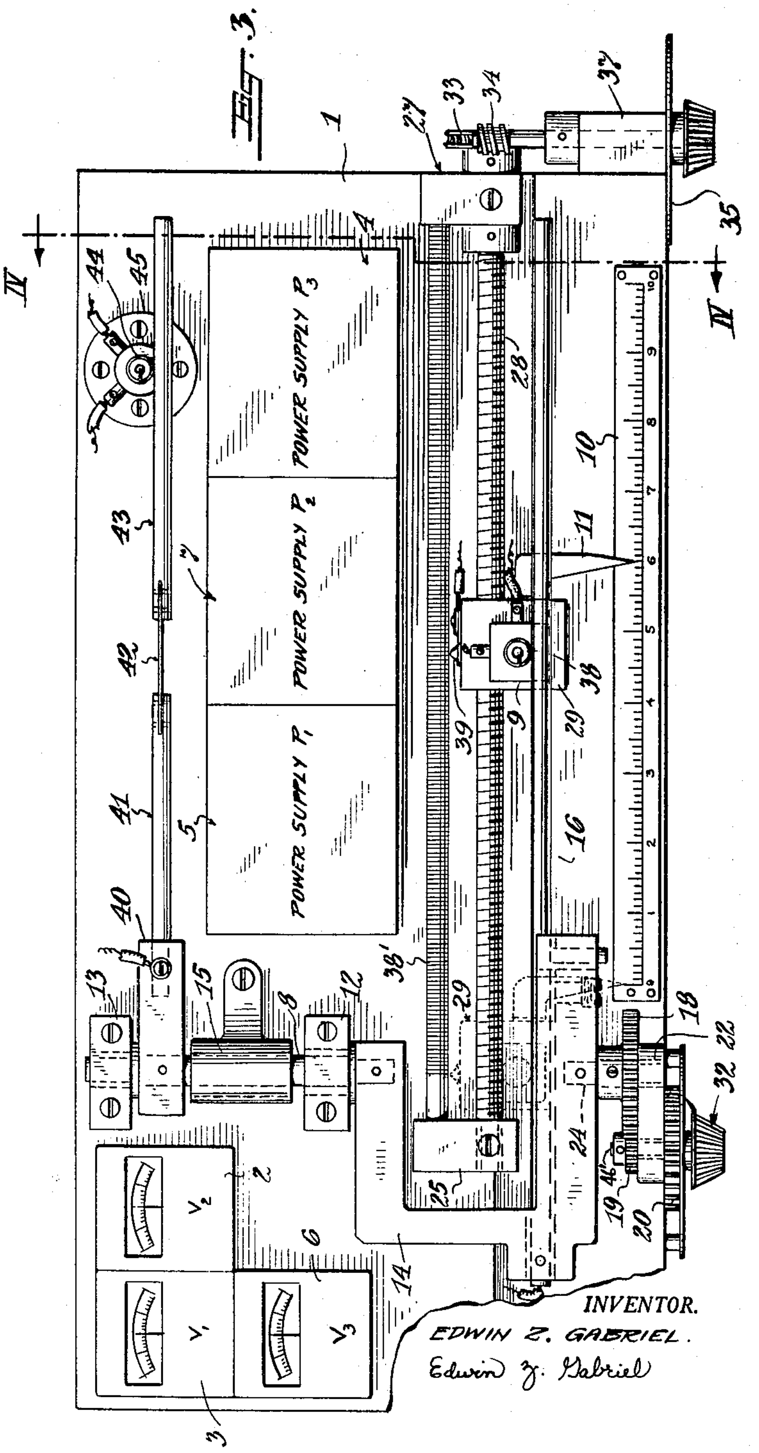

Figures 3 to 8 inclusive show mechanical drawings of one embodiment of the present invention in which the movable members of the device are operated manually. Figure 3 is a plan view. Figure 4 is a sectional view taken at IV—IV of plan. Figure 5 is an enlarged sectional view of the yoke including supporting shaft assemblies. Figure 6 is an enlarged cross sectional view showing one type of resistive element in which the rod is wrapped around with high resistance wire. Figure 7 is an enlarged cross sectional view of a second type of resistive element in which the exterior surface contains a hard semiconducting plastic material. Figure 8 is an isometric view of the entire computer.

Referring now to these mechanical drawings, Fig. 3 shows the computing mechanism suitably supported by base plate 1. On top, as shown, may be mounted calibrated meters 2, 3, 6 for measuring distances in the desired units along members $R_2$, $R_1$ and $R_3$, respectively. For resistive member $R_2$, this length is from the centerline of cylindrical rod 38' to point near the tip of rod 44. For resistive member $R_2$, this length is from the centerline of shaft 8 to a point opposite centerline of member 44. For resistive member $R_3$, this length is from the centerline of cylindrical rod 38' to a point near the tip of rod 38. Also mounted on this plate are voltage supplies $P_1$, $P_2$ and $P_3$ for application across resistive elements $R_1$, $R_3$ and $R_2$ respectively. Scale 10 is mounted on base plate 1 so that its index at zero coincides with the centerline of shaft 8. This scale may be used to check reading of voltmeter 2 and indicator of dial 35. Pointer 11 is mounted on support block 29 shown in Figs. 3, 4 and 8. Also mounted on base plate 1 are bearing housings 12 and 13 to support shaft 8. To one end of shaft 8 is mounted yoke 14. Between the two bearings and on the shaft are located friction unit 15 and rod support 40. The friction unit consists of a spring housing unit containing a flanged drum and a flat spring wrapped around it and then fastened to base plate 1. Support 40 holds a rod assembly consisting of conducting rod 41, leaf spring 42 and conducting rod 43 making contact with vertical resistive element 44. Also on shaft 8 is mounted a gear 18. Gear 18 meshes with a pinion gear 19 on shaft 46'. On shaft 46' is also gear 20 which meshes with pinion 21. This pinion is on shaft 47' which contains knob 31 and dial 32. The overall gear reduction is such that almost one revolution of the knob 31 will cause shaft 8 to rotate 45° approximately.

In addition to dial 32 being graduated in degrees, the total angle of 45° may be subdivided into ten subdivisions from 1 to 10 such that division 1 corresponds to the angle obtained from the arc tangent $\frac{1}{10}$ and division 2 corresponds to the angle obtained from the arc tangent $\frac{2}{10}$. In a similar fashion, the divisions from 3 to 10 are obtained.

Now resistive member 38' is supported by two stationary blocks 25 and 27 and is insulated from these blocks by means of electrical insulating material such as Mypar insulating film. These same blocks also support a second member, lead screw 28, which enables block 29 to be moved along its length. Block 29 also is guided by a dovetailed slot 30 in the base plate. Lead screw 38 is extended beyond support block 27 to which is attached worm wheel 33. Wheel 33 meshes with a worm 34 mounted on another small shaft. This shaft supports knob 36 and graduated dial 35.

Yoke 14 supports rod 16 as shown in Fig. 8 in a horizontal position. Rod 16 makes electrical contact with member 38 containing a linear resistive element. Also to block 29 is fastened contact arm 39 which makes contact with resistive element 38'. Yoke 14 is composed of electrical insulating material and supports a good conducting rod 16. Rod 16 is mounted parallel with rod 41 and moves so as to make the same angle with base plate 1 as does rod 41 at all times. In moving, rod 16 makes good electrical contact with vertical resistive element 38. Square block 9, fastened to block 29, holds vertical member 38 in position.

Calibrated meter 3 measures distance along member 44 from the initial horizontal position of rod 43 to point of contact of rod 43 with resistive member 44. Voltage supply 5 mounted on base 1 is for application across entire length of resistive element 44.

Purpose of flat spring 42 is to cause member 43 to produce the desired pressure against member 44. Also pressure of rod 16 against member 38 is produced by coil spring 23.

The translational back and forth motion required of block 29 may be accomplished by means of an epicyclic gear train. This mechanism is a means of converting rotary motion into rectilinear motion at a faster rate than that shown in Fig. 3.

In addition, the oscillatory motion required of members 16 and 41 may be accomplished by means of a quick return link mechanism. This mechanism is a means of converting from rotary to oscillatory motion at a faster rate than that shown in Fig. 3. The crank of the quick return mechanism may be rotated by the servo motor of a positioning type servomechanism.

To check the readings of calibrated voltmeters 3 and 6 shown in Fig. 3, scales similar to 10 may be placed along the right side of resistive elements 38 and 44.

Figure 9:
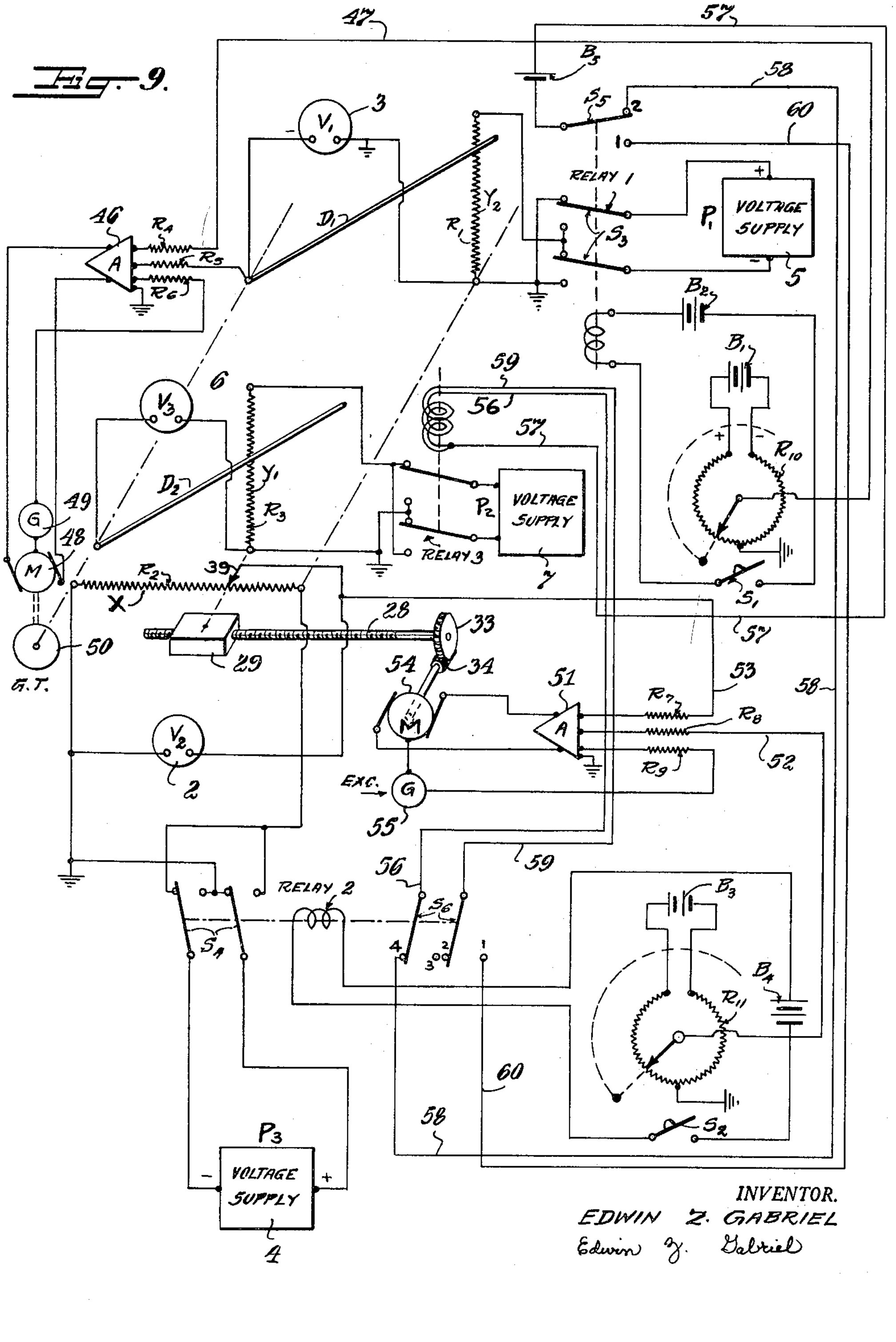

Fig. 9 shows the electric circuit for automatically introducing input information to the computer when multiplying one variable by another. The circuit shown is designed to provide the correct sign to output information. A similar circuit may be used for dividing one variable by a second. When the signs of both variables are alike, the output quantity has a positive value. When the signs of variables differ, the output has a negative value.

The instrumentation to accomplish the aforementioned results are described as follows. Two calibrated center-tapped potentiometers are used to provide input information corresponding to the magnitudes of $Y_2$ and X. The rods $D_1$, $D_2$ and vertical member $R_3$ are automatically driven into the required positions by means of positioning servomechanisms which include electronic amplifiers, servo motors, geartrains to reduce motor speeds to acceptable values and tachometer generators to provide stability to the system. In addition, microswitches and solenoid-operated relays are supplied to provide the proper polarity of voltages across $R_1$, $R_2$ and $R_3$. Now a detailed description follows: Beginning with the circuit for $Y_2$, when switch $S_1$ is open, relay 1 simultaneously applies negative voltage to $R_1$ through switch $S_3$ and causes $S_5$ to make contact with line 58.

Similarly for circuit containing X when switch $S_2$ is open, relay 2 simultaneously applies negative voltage to X through switch $S_4$ and also causes $S_6$ to make contact with terminals 2 and 4.

With switches in positions shown in Fig. 9, relay 3 is energized through line 56 since a closed circuit is obtained via lines 57 and 58 which are connected to battery $B_5$.

For the condition when switches $S_1$ and $S_2$ are both closed, caused by the arms being swept to the right half of the potentiometers, then switch $S_5$ of relay 1 is in position 1 and switch $S_6$ of relay 2 is in positions 3 and 1. This time, relay 3 is again energized through line 50 since a closed circuit is obtained via lines 57 and 60 connected to battery $B_5$.

An explanation is now given as to how the signal flows from the manually set potentiometers $R_{10}$ and $R_{11}$ to the motors which automatically position rods $D_1$ and $D_2$ and resistive element $R_3$. In the circuit containing $R_1$ and switch $S_3$ in position shown, voltage applied to voltmeter $V_1$ is negative. This negative voltage is also applied to amplifier 46 through resistor $R_5$. Simultaneously, positive voltage from potentiometer $R_{10}$ is applied to the same amplifier from potentiometer $R_{10}$ through line 47 and resistor $R_4$. Amplifier 46 drives servomotor 48. The servomotor is mechanically linked to drive tachometer 49 and speed reducer 50. The output shaft of the reducer rotates rods $D_1$ and $D_2$ to the desired angular position. Output voltage from tachometer generator 49 is applied to amplifier 46 through resistor $R_6$ so as to stabilize the motion of motor 48. The output of amplifier 46 represents an amplification of the error voltage between potentiometer setting $R_{10}$ and the instantaneous position of rod $D_1$ in contact with resistive element $R_1$. In a manner similar to the above, the voltage signal flows from potentiometer $R_{11}$ to servomotor 54. The latter drives both resistive element $R_3$ and contact arm 39 to the desired translational position through a worm and lead screw drive. Calibrated voltmeter $V_3$, corrected for scale factor, gives the product of X and $Y_2$.

Figure 10:
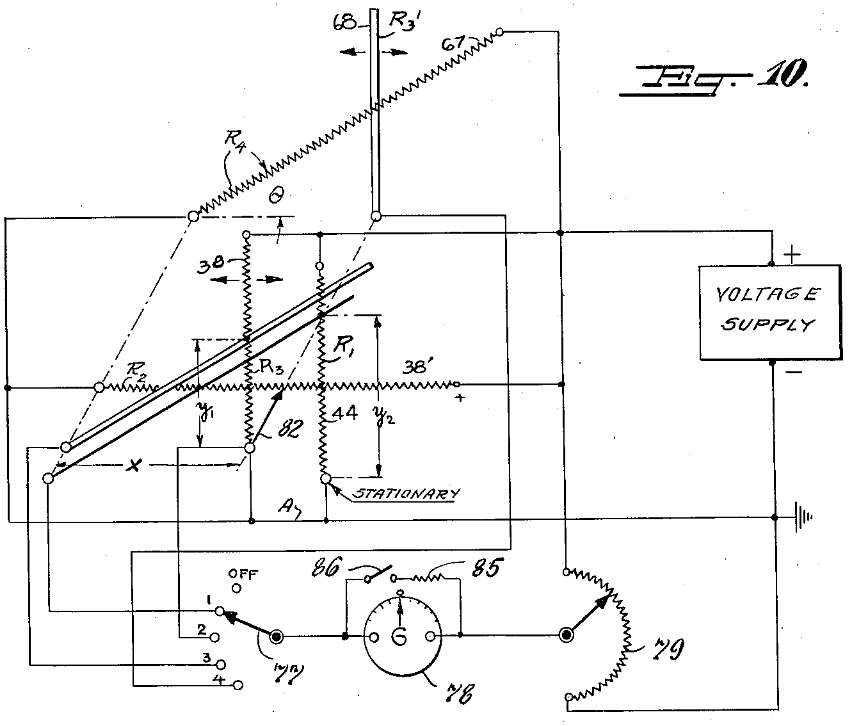
Figure 10 illustrates the geometry of the more compact version of the computer and one in which the additional function of coordinate conversion is performed.

Referring now to the modifications which are included in Figures 10 to 20 inclusive, it will be seen that Figure 10 is similar to Figure 2 except that a combined good conductor rod 16 and 62 is used in place of the separate rods $D_1$ and $D_2$. Also in Figure 10 a movable resistor rod $R_4$ and a contacted good conducting upright rod 68 have been included for conversion of X and $Y_1$ into polar coordinates R and $\theta$.

In further reference to Fig. 10, distance A represents the base of the triangle and is fixed. Vertical resistance member R, represents one variable $Y_2$. Vertical resistance member $R_3$ represents a second variable $Y_1$ and horizontal resistance member $R_2$ represents a third variable X. Oblique resistance member $R_4$ making an angle $\theta$ with the base represents a fourth variable.

The same voltage in the range of 10 to 50, A.C. or D.C., is applied simultaneously to all of the resistance members $R_1$ to $R_4$ inclusive. Conducting wires connect conductors 16, 82, 62 and 68 to different contact positions of a rotary selector switch 77, and selector arm then has its terminal connected to one terminal of a null voltage detector or galvanometer 78. The other terminal of the null detector is connected to the movable contact arm of a graduated linear potentiometer 79. Thus a Wheatstone bridge arrangement is simulated. Dials 32 and 35, graduated in units from one to ten, also give magnitudes of $Y_2$ and X, respectively. Rotary switch position 1 enables one to obtain $Y_2$ through the galvanometer and the potentiometer. Rotary switch position 2 enables one to obtain X. Rotary switch position 3 enables one to obtain $Y_1$. Rotary switch position 4 enables one to obtain hypotenuse R.

To further understand the operation of the computer, the procedures for solving three general types of problems are explained. In type 1 problem, side $Y_1$ or a multiplication is desired and multiplier variable X and multiplicand variable $Y_2$ are given. Rotary switch 77 is initially in off position. To set given distance $Y_2$, set rotary switch to position 1 and potentiometer position to value of $Y_2$ by rotating dial 32 until galvanometer 78 reads zero. The galvanometer is equipped with a conventional damping resistor 85 and cut-out shunt switch 86 that would be normally closed for initial nulling out and is opened for final refined reading. It will be understood without repetition that the same procedure of the use of the galvanometer is followed in all of the cases cited below. To set given distance X, set rotary switch to position 2 and potentiometer position to value of X by rotating dial 35 until galvanometer 78 again reads zero. Now set rotary switch to position 3 and rotate arm of potentiometer 79 until galvanometer again reads zero. The potentiometer reading gives distance $Y_1/10$ in the units of $Y_2$ and X.

In type 2 problem side X or a quotient is desired. Dividend $Y_1$ and divisor $Y_2$ are given. Rotary switch is initially in off position. To set given distance $Y_2$, set rotary switch to position 1 and also potentiometer to value of $Y_2$ by rotating dial 32 until null detector 78 reads zero. To set given distance $Y_1$, set rotary switch to position 3 and also potentiometer to value of $Y_1$ by rotating dial 35 until null detector 78 again reads zero. Now set rotary switch to position 2 and rotate potentiometer arm until galvanometer again reads zero. The potentiometer reading gives 10X in the units of $Y_1$ and $Y_2$. In type 3 problem, sides X and $Y_1$ of a right triangle are given and the hypotenuse R and angle $\theta$ of this triangle are required. To set distance X rotate selector switch to position 2 and rotate potentiometer arm until galvanometer reads zero. To set distance $Y_1$ set selector switch to position 3 and rotate potentiometer arm until galvanometer again reads zero. Now set rotary switch to position 4 and rotate potentiometer arm until galvanometer again reads zero. The potentiometer reading gives R in the units of X and $Y_1$. Dial 32 being also graduated in degrees from 0° to 45° gives angle $\theta$.

Figures 11 to 18 inclusive show mechanical drawings of another embodiment of the present invention in which the movable members of the device are operated manually. This construction is somewhat condensed over the previous one in that a common rod 16 with conductor 62 makes contact with the vertical linear resistance rods 38 and 44 instead of the latter rods being independently contacted by rods 16 and 43.

Referring now in more detail to the modified construction of Figs. 10 to 18, the computing mechanism is shown suitably supported by base plate 81 at the under side of which are four foot buttons 75. On top of the base plate 81 may be mounted a 5-position rotary selector switch 77, a null detecting galvanometer 78 and a 10-turn potentiometer with graduated dial 79 for measuring distances in the desired units along members $R_2$, $R_1$, $R_3$ and $R_4$ respectively. For resistance member $R_1$, the maximum length is from the centerline of cylindrical rod 38′ to a point near the tip of rod 44. For resistance member $R_2$ the maximum length is from the centerline of shaft 8 to a point opposite centerline of member 44. For resistance member $R_3$, the maximum length is from the centerline of cylindrical rod 38′ to a point near the tip of rod 38. Also mounted on base plate 81 is voltage supply $P_4$ for application across resistance elements $R_1$, $R_2$, $R_3$ and $R_4$. Scale 10 is mounted on base plate 81 so that its index at zero coincides with the centerline of shaft 8. Pointer 71 is mounted on support block 80 shown in Figure 12. Also mounted on base 81 are bearing housings 12 and 64 to support shafts 8 and 24 respectively. To one end of shaft 24 is mounted a yoke 65. Between a metal washer 88 and yoke 65 is located a combination friction and resilient tension disc 63, which is compressed in assembly, to push against bearing housing 64 and thus cause rod 16 to press against rod 38 and rod 67 to press against rod 68. This disc also could have been located between bearing 12 and collar 84 to serve the same purpose as above. Two views of this disc are shown in Figs. 16 and 17. The purpose of the risers on the resilient washer is to promote friction between the contacting surfaces. Support hub 84 holds a resistance rod 67 which is held in place by a pair of clamps 74 as shown in Figure 13 and rod 67 makes contact with vertical good conducting rod 68, which is insulated from its base block 69. Block 69 may be moved along the length of base 81 and is guided by slot 87. Provision is made for a conducting wire to be connected to rod 68 near its base. In addition to the pressure afforded by resilient disc 63, contact between rods 67 and 68 is assured through magnetic attraction of the steel tubings. Rod 68 has a magnetic rod, such as an Alnico magnet, inserted into its hollow center. To promote good electrical conduction between all contacting rods, the contacting surfaces of the good conducting rods are finished with a good conducting metal alloy such as a silver alloy or a sliver of good conducting metal could be imbedded along the entire length of the conductor along the line of contact. Also on shaft 24 in Figs. 11 and 18 is mounted gear 18. As in Fig. 8, gear 18 meshes with pinion gear 19 on shaft 46′. On shaft 46′ is also gear 20 which meshes with pinion 21. This pinion is on shaft 47′ which contains knob 31 and dial 32. The overall gear reduction is such that almost one revolution of knob 31 will cause shaft 24 to rotate 45°.

In addition to dial 32 being graduated in degrees, the total angle of 45° may be subdivided into ten subdivisions from 1 to 10 such that division 1 corresponds to the angle obtained from the arc tangent $1/10$ and division 2 corresponds to the angle obtained from the arc tangent $2/10$. In a similar fashion, the divisions from 3 to 10 are obtained.

As in Fig. 8, Figs. 11 and 18 show horizontal resistance member 38′ supported by two stationary support blocks 25 and 27 and to avoid the possibility of shorting, member 38′ is insulated from these blocks by means of electrical insulating varnish or tape. As before, these same blocks support a second member, lead screw 28, which enables block 80 to be moved along its length. Block 80 also is guided by a slot 70 in the base plate. Lead screw 28 is extended beyond support block 27 and to that extension is attached a bevel gear 33′. Gear 33′ meshes with a pinion 34′ mounted on another small shaft. This shaft supports knob 36 and graduated dial 35. One rotation of dial 36 corresponds to one division of scale 10, and thus serves as a vernier.

Yoke 65 supports rod 16 as shown in Fig. 18 in an initially horizontal position. Rod 16 makes electrical contact with member 38 providing a linear resistance element to establish a variable $R_3$. Block 80 supports a smaller insulating block 72 to which is fastened contact arm 82 which wipes on resistance element 38′, as shown in Fig. 12 to establish variable $R_2$. Yoke 65 is composed of electrical insulating material such as impregnated nylon and supports a good conducting rod 16. Good conductor rod 16 is mounted parallel with resistance rod 67 and moves so as to make the same angle with base plate 81 as does rod 67 at all times. Like rod 68, rod 16 is finished with a good conducting metal such as silver, particularly along its line of contact with resistor rod 38. Conductor 62, having its exterior surfaced with a good conducting metal, is fastened to rod 16 but insulated therefrom by insulating material 62′ as indicated in Fig. 15. In moving, rod 16 makes good electrical contact with vertical resistance rod 38 while conductor 62, by virtue of its being made of a springy alloy and initially flexed out, prior to assembly, simultaneously makes good electrical contact with resistance element 44. In addition to the pressure afforded by resilient disc 63, contact pressure between rods 16 and 38 is assured through magnetic attraction of the steel tubings. Rod 16 has a magnetic rod, such as Alnico magnet, inserted into its hollow center, as shown in Figs. 12 and 14. It should be mentioned that blocks 69 and 80 move together when dial 35 is rotated and are maintained in alignment with shaft 8, as shown in Figures 11 and 18, by means of a tie-bar 73 attached rigidly to the pendant portions of blocks 69 and 80 shown in Fig. 12. Between yoke 65 and bearing 12 on shaft 8 is a metal washer 63′.

Fig. 19 shows a more simplified electric circuit than Fig. 9 for automatically introducing input information to the computer when multiplying one variable by another. This circuit is also designed to provide the correct sign to the output information. A similar circuit to the one shown may be used for divding one variable by a second one. The simplification of this circuit over Fig. 9 centers about the fact that voltage supplies $B_1$, $B_2$ and 5 have been combined into a single supply resulting also in the elimination of relay 1 and switch $S_3$. Also the solutions obtained from the computer will be more accurate since each variable depends for its solution on a single voltage supply whose slight fluctuations are independent of the accuracy of solution. In the circuit of Fig. 9, if voltage supply $B_1$ fluctuates differently from supply 5, the accuracy of solution is affected. Also switch $S_5$ is combined with switch $S_1$, and the new switch is now a double-pole double-throw (DPDT) micro-switch. In a similar manner, voltage supplies $B_3$, $B_4$ and 4 have been combined into a single supply, and relay 2 and switch $S_4$ are eliminated. Switch $S_6$ has been combined with switch $S_2$ and the new switch is now a triple-pole double-throw (TPDT) micro-switch.

The instrumentation to accomplish the aforementioned results are described as follows. Two calibrated center-tapped potentiometers are used to provide input information corresponding to the magnitudes of $Y_2$ and X. The rods 16 and 67 and vertical rods 38 and 68 are automatically driven into the required positions by means of positioning servomechanisms which include electronic amplifiers, servo motors, gear trains to reduce motor speeds to acceptable values and tachometer generators to provide stability to the system. The microswitches and solenoid-operated relays supplied provide the proper polarity of voltages across resistances $R_1$, $R_2$ and $R_3$ of rods 44, 38′ and 38 respectively. A detailed description follows:

Beginning with the circuit for $Y_2$, Fig. 19, when switch $S_3$ is in the position shown, it is applying negative voltage to linear resistance $R_1$. Switch $S_5$, being ganged to $S_3$ is simultaneously making contact with terminal 2 of line 58.

Similarly, for the circuit containing linear resistance $R_2$, when $S_4$ is in position shown, it is applying negative voltage to $R_2$. Switch $S_6$, being ganged to $S_4$, is simultaneously making contact with terminal 4 of line 58. Terminal 2 is unconnected, as indicated in Fig. 19.

With switches in position shown in Fig. 19, relay 1 is energized through line 56 since a closed circuit is obtained via lines 57 and 58 which include battery $B_5$.

For the condition when switches $S_3$ and $S_4$ are in the down position, caused by the potentiometer arms being swept to the right half of the potentiometers $R_{10}$ and $R_{11}$, respectively, then switch $S_5$, being ganged to $S_3$, making contact with terminal 1. Switch $S_6$, being ganged to $S_4$, is making contact with terminals 1 and 3. For this condition also relay 1 is energized, but this time through line 59. A closed circuit is obtained via lines 57 and 60 which include battery $B_5$.

If the arm of one potentiometer is providing a positive voltage and the arm of the other potentiometer is providing a negative voltage, then relay 1 is no longer energized, since an open circuit has resulted via line 56 to battery $B_5$ and via line 59 to the same battery.

An explanation of how the signal flows from the manually set potentiometers $R_{10}$ and $R_{11}$ to the motors which automatically position rods 16 and 67 and vertical rods 38 and 68 is the same as given for Fig. 9. Calibrated voltmeter $B_3$, corrected for scale factor, gives the product of X and $Y_2$. However, here again accuracy could be improved by having the potentiometer wired in parallel with resistance $R_3$ and using a galvanometer as a null detector. When the galvanometer is nulled, potentiometer reading represents the product of X and $Y_2$.

Figure 20 shows the extension of shaft 8 on line *a—a* of Fig. 19 from its showing in Figure 19 and performs the function of determining distance R electrically, by means disclosed in Figure 18. When distances $Y_1$ and X are known and are automatically set by adjusting potentiometer arms $R_{10}$ and $R_{11}$, respectively, to their known values, then distance R is available. Next by adjusting potentiometer arm $R_{12}$ so as to give a zero reading on null detector 78, the potentiometer reading is then the desired distance R in the units of $Y_1$ and X. Voltage across R is impressed by voltage supply $P_4$.

What is claimed is:

1. A system for physically presenting a triangular configuration of a geometric problem, the end result of which is to produce a voltage proportional to the product of two variable quantities, said system comprising an elongated base member having a slot, a translationally movable block on said base slidably retained by said slot, a plurality of conductors of which two are good conductors and three others are resistors, said two good conductors having pivotal mounting next to one end of said base member and interconnected to each other so both make the same angle in relation to said base, one of said good conductors making contact in its various pivoted positions with a first one of said resistors, the other of said good conductors making contact in its various pivoted positions with a second one of said resistors, both the first and second resistors being perpendicular to said base and all of said resistors having voltages impressed there through, the third one of said resistors being parallel to the direction of translational movement of said block and said block having means for contacting said resistor as the block moves translationally, means for moving said two good conductors pivotally and means for moving said block translationally, graduated dials for indicating amounts of movement of said conductors and block, and meters for indicating voltages to points of contact on said resistors.

2. A system for physically presenting a triangular configuration of a geometric problem, the end result of which is to produce a voltage proportional to the product of two variable quantities, said system comprising an elongated base member having a slot, a translationally movable block on said base slidably retained by said slot, a plurality of conductors of which two are good conductors and three others are resistors, said two conductors being pivotally mounted next to one end of said base member and interconnected to each other so both make the same angle in relation to said base, one of said good conductors making contact in its various pivoted positions with a first one of said resistors, the other of said good conductors making contact in its various pivoted positions with a second one of said resistors, both the first and second resistors being perpendicular to said base and all of said resistors being parallel to the direction of translational movement of said block and said block having means for contacting said resistor as the block moves transitionally, automatic means for moving said two conductors pivotally and automatic means for moving said block translationally, graduated dials for indicating amounts of movement of said rods and block, and meters for indicating voltages to points of contact on said resistors.

3. A system for physically presenting a triangular configuration of a geometric problem, the end result of which is to produce a voltage proportional to the product of two variable quantities, said system comprising an elongated base member having a slot, a translationally movable block on said base slidably retained by said slot, a plurality of conductors of which two are good conductors and three others are resistors, said two good conductors having pivotal mounting next to one end of said base and interconnected to each other so both make the same angle in relation to said base, one of said good conductors making contact in its various pivoted positions with a first one of said resistors, the other of said good conductors making contact in its various pivoted positions with a second one of said resistors, both the first and second resistors being perpendicular to said base and all of said resistors having voltages impressed there through, the third one of said resistors being parallel to the direction of translational movement of said block and said block having means for contacting said resistor as the block moves translationally, automatic means for moving said two good conductors pivotally and automatic means for moving said block translationally, graduated dials for indicating amounts of movement of said conductors and block, and meters for indicating voltages to points of contact on said resistors, said system thereby including mechanically contacting relays and switches responsive to the polarity of each of two input variables for introducing the correct polarity of each imput variable and for producing the correct polarity of the output which is proportional to the product of the first two input variables.

4. A system for physically presenting a triangular configuration of a geometric problem, the end result of which is to produce a voltage proportional to the product of two variable quantities, said system comprising an elongated base member having a slot, translationally movable block on said base slidably retained by said slot, a plurality of rods of which two are good conductors and three others are resistors, said two rods being pivotally connected to one end of said base member and interconnected to each other so both make the same angle in relation to said base, one of said good conductor rods making contact in its various pivoted positions with a first one of said resistors, the other of said good conductor rods making contact in its various pivoted positions with a second one of said resistors, both the said first and second resistors being perpendicular to said base and all of said resistors having voltages impressed there through, the third one of said resistors being parallel to the direction of translational movement of said block and said block having means for contacting said resistor as the block moves translationally, means for moving said two rods pivotally and means for moving said block translationally, graduated dials for indicating amounts of movement of said rods and block, and meters for indicating voltages to points of contact on said resistors.

5. A system for physically presenting a triangular configuration of a geometric problem, the end result of which is to produce a voltage proportional to the product of two variable quantities, said system comprising an elongated base member having a slot, a translationally movable block on said base slidably retained by said slot, a plurality of rods of which two are good conductors and three others are resistors, said two rods being pivotally connected to one end of said base member and interconnected to each other so both make the same angle in relation to said base, one of said good conductor rods making contact in its various pivoted positions with a first one of said resistors, the other of said good conductor rods making contact in its various pivoted positions with a second one of said resistors, both the said first and second resistors being perpendicular to said base and all of said resistors having voltages impressed there through, the third one of said resistors being parallel to the direction of translational movement of said block and said block having means for contacting said resistor as the block moves translationally, automatic means for moving said two rods pivotally and automatic means for moving said block translationally, graduated dials for indicating amounts of movement of said rods and block, and meters for indicating voltages to points of contact on said resistors.

6. A system for physically presenting a triangular configuration of a geometric problem, the end result of which is to produce a voltage proportional to the product of two variable quantities, said system comprising an elongated base member having a slot, a translationally movable block on said base slidably retained by said slot, a plurality of rods of which two are good conductors and three others are resistors, said two rods being pivotally connected to one end of said base member and interconnected to each other so both make the same angle in relation to said base, one of said good conductor rods making contact in its various pivoted positions with a first one of said resistors, the other of said good conductor rods making contact in its various pivoted positions with a second one of said resistors, both the said first and second resistors being perpendicular to said base and all of said resistors having voltages impressed there through, the third one of said resistors being parallel to the direction of translational movement of said block and said block having means for contacting said resistor as the block moves translationally, automatic means for moving said two rods pivotally and automatic means for moving said block translationally, graduated dials for indicating amounts of movement of said rods and block, and meters for indicating voltages to points of contact on said resistors, and system thereby including mechanically contacting relays and switches, responsive to the polarity of each of two input variables, for introducing the correct polarity of each input variable and for producing the correct polarity of the output which is proportional to the product of the first two input variables.

7. A system for physically presenting a triangular configuration of a geometric problem, the end result of which is to produce a voltage proportional to the product of two variable quantities, said system comprising an elongated base member having a slot, a translationally movable block on said base slidably retained by said slot, a plurality of conductors of which one is a tubular steel rod constituting a first good conductor and three others are poor conductors and constitute resistors, said good conductor being pivotally mounted next to one end of said base member, magnetized rod within the tubular hollow of said first good conductor, said good conductor being thereby magnetically attracted to and making contact at its various pivoted positions with a first one of said resistors, a second good conductor having corresponding pivoting with the first good conductor and simultaneously making contact in its various pivoted positions with a second one of said resistors, resilient means urging said contact of said second good conductor and resistor, all of said resistors having voltages impressed there through, the third one of said resistors being parallel to the direction of translational movement of said block and said block having means for contacting said third resistor as the block moves translationally, means for moving said good conductors pivotally, means for moving said block translationally, graduated dials for indicating amounts of movement of said conductors and block, and meters for indicating voltages to points of contact on said resistors.

8. A system for multiplying two variables by physically presenting a triangular configuration of a geometric problem, said system comprising a base member having a slot, a translationally movable block on said base slidably retained by said slot, a plurality of conductors of which a first one is solely a good conductor and three others are poor conductors and constitute resistors, said good conductor having a complementary second good conductor substantially paralleling the same and insulated therefrom, said good conductors having pivotal mounting common to both next to one end of said base member and each said good conductor making contact in its various pivoted positions with a respective first and second one of said resistors, the first said resistor having a wiper in contact with a third one of said resistors, said third resistor being stationary and transverse to said first resistor, all of said resistors having voltages impressed there through, a null voltage detector and a graduated potentiometer with contact arm and resistance connected so as to compare electrically the position of contact of said potentiometer arm to its resistance with the position of contact of a said good conductor on its respective resistor, the position of contact of the potentiometer arm relative to one end of the potentiometer resistance indicating the position of the said good conductor being compared relative to an end of the respective resistor.

9. A system for physically presenting a triangular configuration of a geometric problem, the end result of which is to produce a voltage proportional to the product of two variable quantities, said system comprising an elongated base member having a slot, a translationally movable block on said base slidably retained by said slot, a plurality of conductors of which two are good conductors and three others are resistors, said two good conductors having pivotal mounting next to one end of said base member and interconnected to each other so both make the same angle in relation to said base, one of said good conductors making contact in its various pivoted positions with a first one of said resistors, the other of said good conductors making contact in its various pivoted positions with a second one of said resistors, a resilient disc on said pivotal mounting for said two good conductors urging said first good conductor into said contact with its respective resistor, both the first and second resistors being perpendicular to said base and all of said resistors having voltages impressed there through, the third one of said resistors being parallel to the direction of translational movement of said block and said block having means for moving said two good conductors pivotally and means for moving said block translationally, graduated dials for indicating amounts of movement of said conductors and block, and meters for indicating voltages to points of contact on said resistors.

10. A system for physically presenting a triangular configuration of a geometric problem, the end result of which is to produce a voltage proportional to the product of two variable quantities and a voltage proportional to a third quantity, said system comprising an elongated base member having a slot, a translationally movable block on said base member slidably retained by said slot, a plurality of conductors of which two are good conductors and three others are resistors, said two good conductors having pivotal mounting to one end of said base member and interconnected to each other so both make the same angle in relation to said base, one of said good conductors making contact in its various pivoted positions with a first one of said resistors, the other of said good conductors making contact in its various pivoted positions with a second one of said resistors, both the said first and second resistors being perpendicular to said base and all said resistors having voltage impressed there through, the third one of said resistors being parallel to the direction of translational movement of said block and said block having means for contacting said resistor as the block moves translationally, means for moving said two good conductors pivotally and means for moving said block translationally, a third good conductor and a fourth resistor in contact with each other, said third good conductor being perpendicular to said base and movable translationally with said block, and said fourth resistor having common pivotal mounting with the first two said conductors so as to make the same angle therewith to the base, graduated dials for indicating amounts of movement of said pivoted conductors and block, and meters for indicating voltages to points of contact on said resistors.

No references cited.